(12) United States Patent
Phinney

(10) Patent No.: US 6,315,976 B1
(45) Date of Patent: Nov. 13, 2001

(54) METHOD OF PRODUCING POTASSIUM SULFATE

(75) Inventor: Robin Phinney, Calgary (CA)

(73) Assignees: Aristos Capital Corporation; Airborne Industrial Minerals Inc., both of Calgary (CA)

(*) Notice: Subject to any disclaimer, the term of this patent is extended or adjusted under 35 U.S.C. 154(b) by 0 days.

(21) Appl. No.: 09/332,500

(22) Filed: Jun. 14, 1999

Related U.S. Application Data
(60) Provisional application No. 60/089,630, filed on Jun. 19, 1998.

(51) Int. Cl.[7] .................................................. C01D 5/00
(52) U.S. Cl. ...................... 423/551; 423/357; 423/430; 423/518; 423/544; 423/552
(58) Field of Search .................................. 423/518, 544, 423/551, 552, 357, 430

(56) References Cited

U.S. PATENT DOCUMENTS

| | | | |
|---|---|---|---|
| 1,824,361 | 9/1931 | Morse | 423/551 |
| 1,922,682 | 8/1933 | Holz | 23/121 |
| 1,936,070 | 11/1933 | Ritchie et al. | 23/121 |
| 1,990,896 | 2/1935 | Connel | 23/121 |
| 2,882,128 | * 4/1959 | Lafont | 423/552 |
| 3,369,867 | 2/1968 | May | 23/121 |
| 3,423,171 | 1/1969 | Hoppe et al. | 23/121 |
| 3,429,657 | 2/1969 | George et al. | 23/63 |
| 3,436,175 | 4/1969 | Atwood et al. | 23/119 |
| 3,528,767 | 9/1970 | Garrett | 23/89 |
| 3,578,399 | 5/1971 | Boeglin | 23/121 |
| 3,656,891 | 4/1972 | Chemtob | 23/59 |
| 3,687,639 | 8/1972 | Barlow et al. | 23/300 |
| 3,843,772 | 10/1974 | Boeglin | 423/551 |
| 3,895,920 | 7/1975 | Garret | 23/298 |
| 3,967,930 | 7/1976 | Sadan | 23/296 |
| 3,998,935 | 12/1976 | Adams et al. | 423/552 |
| 4,045,543 | 8/1977 | Sardisco | 423/482 |
| 4,129,642 | 12/1978 | Neitzel | 423/199 |
| 4,174,382 | 11/1979 | Menche | 423/552 |
| 4,215,100 | 7/1980 | Sokolov et al. | 423/552 |
| 4,268,492 | 5/1981 | Sardisco et al. | 423/482 |
| 4,342,737 | 8/1982 | Iwashita et al. | 423/522 |
| 4,371,512 | 2/1983 | Sardisco et al. | 423/551 |
| 4,436,710 | 3/1984 | Miyazaki et al. | 423/552 |
| 4,533,536 | 8/1985 | Bichara et al. | 423/551 |
| 4,554,151 | 11/1985 | Worthington et al. | 423/551 |
| 4,562,058 | 12/1985 | Dancy et al. | 423/551 |
| 4,588,573 | 5/1986 | Worthington et al. | 423/552 |
| 5,298,050 | 3/1994 | McLaughlin et al. | 71/63 |
| 5,366,534 | 11/1994 | Fischbein et al. | 71/63 |
| 5,529,764 | 6/1996 | Lampert et al. | 423/552 |
| 5,549,876 | 8/1996 | Zisner et al. | 423/199 |
| 5,552,126 | 9/1996 | Efraim et al. | 423/199 |

FOREIGN PATENT DOCUMENTS

| | | | |
|---|---|---|---|
| 1197663 | 3/1983 | (CA) | C01D/5/10 |
| 1902738 | * 9/1970 | (DE) | 423/552 |
| 279009 A1 | * 5/1990 | (DE) | 423/552 |
| 411 820 A | 6/1934 | (GB) | . |
| 52-6396 | * 1/1977 | (JP) | 423/552 |

OTHER PUBLICATIONS

Database WPI, Section Ch, Week 9715, Derwent Publications Ltd., London, Great Britain, Class C04, AN 97–154962, XP002116365 and CN 1 091 112 A (Hunan Prov Chem Fertilizer Ind., Aug. 24, 1994, Abstract.

* cited by examiner

*Primary Examiner*—Steven P. Griffin
*Assistant Examiner*—Timothy C Vanoy

(57) ABSTRACT

A process is provided for producing potassium sulfate by reacting ammonium sulfate and potassium chloride at a temperature of about 30 to 40° C. to produce a slurry containing $K_2SO_4 \cdot NH_4 \cdot 2SO_4$ double salt, and reacting this double salt with an aqueous solution containing potassium chloride at a temperature of about 30° C. to produce a slurry containing potassium sulfate. The slurry containing potassium sulfate is subjected to a solids/liquid separation step to obtain potassium sulfate crystals having a size in the range of about 20 mesh to about 150 mesh.

8 Claims, 2 Drawing Sheets

METHOD OF PRODUCING POTASSIUM SULFATE

This application claims the benefit of U.S. Provisional application Ser. No. 60/089,630 filed Jun. 16, 1998.

FIELD OF THE INVENTION

The present invention relates to a method of producing potassium sulfate and more particularly, the invention relates to a method of synthesizing pure potassium sulfate from brines of ammonium sulfate with up to 12% $Na_2SO_4$ impurities.

BACKGROUND OF THE INVENTION

The prior art has established countless methods of preparing potassium sulfate. Typical of the known methods is exemplified by U.S. Pat. No. 4,588,573, issued May 13, 1986, to Worthington et al. In this reference, potassium chloride and sulfuric acid are reacted. Although meritorious, the method requires sulfuric acid which is generally expensive and requires special conditions for handling.

The co-production of potassium sulfate, sodium sulfate and sodium chloride is taught in U.S. Pat. No. 5,552,126, issued to Efraim et al., Sep. 3, 1996. Progressive precipitations with an evaporation step are requisite for the process. As is well known in chemical process design, costly energy consuming unit operations add to the overall operating expenses for the process which are translated to the profit margin. Accordingly, it is most desirable to avoid such operations in processes.

U.S. Pat. No. 5,549,876, issued Aug. 27, 1996, to Zisner et al., provides methodology for potassium sulfate production involving differential contacting. Potash, water and sodium sulfate are placed in a differential countercurrent contactor to produce the potassium sulfate.

Potassium chloride and sulfuric acid are reacted and the resulting mixture kneaded to produce potassium sulfate, as disclosed by Iwashita et al., in U.S. Pat. No. 4,342,737, issued Aug. 3, 1982.

Other methods of manufacture include fractional crystallization of sulfate ores or by the Hargreaves process.

It would be most desirable for potassium sulfate production to be achieved without the use of acids, high energy input or other such unit operations. The present invention provides for such a process.

SUMMARY OF THE INVENTION

One object of the present invention is to provide an improvement in potassium sulfate preparation.

Generally speaking, the process results in the formulation of useful products during the synthesis of the potassium sulfate with recovery of sulfate and potassium in excess of 95% completely in the absence of evaporation. This significant feature has particular importance in terms of energy efficiency and thus the costs of the process.

A further object of one embodiment of the present invention is to provide a method of producing potassium sulfate from a source containing ammonium sulfate, comprising the steps of:

contacting potassium chloride and ammonium sulfate in a mixer at a temperature of between 20° C. and 40° C.;

precipitating a first precipitate of double salt in a filtrate;

mixing, in a second mixing step, the filtrate with potassium chloride;

generating a second filtrate containing ammonium and potassium chloride and a second precipitate of double salt;

mixing the second double salt precipitate with the first precipitate in a solution of potassium chloride;

precipitating a third precipitate of potassium sulfate and a third filtrate;

recirculating the third filtrate into the second mixing step;

mixing the second filtrate in a mixing tank at a temperature of less than 70° C. in a solution of less than 10% by weight sodium chloride, calcium chloride and sodium sulfate; and generating a syngenite precipitate and a fourth filtrate.

Another object of one embodiment of the present invention is to provide a method of producing potassium sulfate from a source containing ammonium sulfate, comprising the steps of:

contacting potassium chloride and ammonium sulfate in a mixer at a temperature of less than 30° C.;

precipitating a first precipitate of double salt in a filtrate;

mixing, in a second mixing step, said filtrate with potassium chloride;

generating a second filtrate containing ammonium and potassium chloride and a second precipitate of double salt;

mixing said second double salt precipitate with said first precipitate in a solution of potassium chloride;

precipitating a third precipitate of potassium sulfate and a third filtrate;

recirculating said third filtrate into said second mixing step;

mixing said second filtrate in a mixing tank at a temperature of less than 70° C. in a solution of less than 10% by weight sodium chloride, calcium chloride and sodium sulfate;

generating a syngenite precipitate and a fourth filtrate;

mixing, in a sealed mixing tank at a temperature of about 80° C., said fourth filtrate with less than about 18% by weight sodium chloride, about 23.6% ammonium chloride and lime or hydrated lime;

recovering ammonia from said fourth filtrate;

passing said fourth filtrate into an air scrubber and further removing ammonia from calcium chloride and sodium chloride;

passing said fourth filtrate into an ammonium scrubber to generate ammonium sulfate;

passing said syngenite precipitate into a mixing tank at a temperature of about 70° C. in the presence of ammonium bicarbonate;

generating a calcium carbonate precipitate and a fifth filtrate containing potassium sulfate and ammonium sulfate; and recycling said fifth filtrate to at least one of the mixing steps.

Having thus described the invention, reference will now be made to the accompanying drawing illustrating a preferred embodiment.

DETAILED DESCRIPTION OF THE PREFERRED EMBODIMENTS

Figure 1:
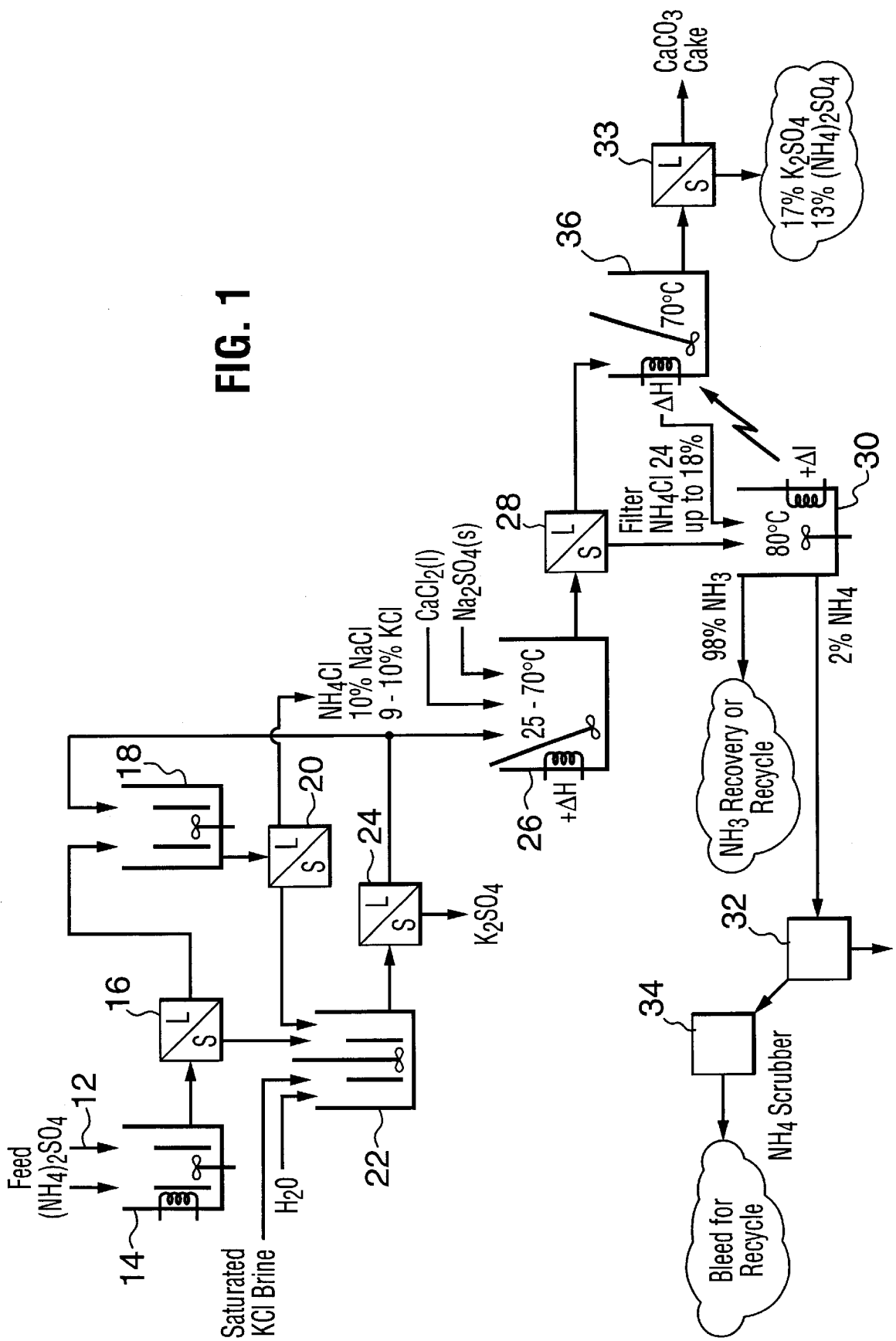
FIG. 1 is a schematic illustration of the process flow diagram according to one embodiment of the present invention.

Potassium sulfate is a valuable chemical commodity, typically employed in analytical chemistry, cement mixes and fertilizer for chloride sensitive crops such as citrus and tobacco crops. The compound is also used in the manufacture of glass, alum and is used as a food additive.

Referring now to the drawing, the overall process is broadly denoted by numeral 10. The feedstock material 12 includes solid potassium chloride and ammonium sulfate in an amount less than about 40% by weight $(NH_4)_2SO_4$. The compounds are mixed in a mixing tank 14, which tank 14 is heated to between 25° C. and 30° C. in order for the conversion of the compounds to double salt. After sufficient mixing, the solution is passed into a separator 16, an example of which is a cyclone. The resulting solid is $K_2SO_4 \cdot (NH_4) \cdot 2SO_4$, double salt. The first filtrate is subsequently passed into a second mixing container 18 into which is added additional potassium chloride brine. The container is heated similarly to container 14 and once mixed, the solution is separated by separator 20. The resulting second filtrate is subjected to further unit operations to be discussed hereinafter.

The second precipitate from mixing tank 18 as well as the first precipitate from tank 14 are combined in a third heated container 22 together with saturated potassium chloride brine. The product is then separated by separator 24 into a third filtrate for recycle into container 18 and a third solid comprising potassium sulfate crystals in a size distribution of approximately 20 mesh to about 150 mesh. In this portion of the circuit, the yield is approximately 95% $SO_4$ and 80% potassium.

Returning now to the second filtrate from the separator 20, the same contains ammonium chloride, sodium chloride (approximately 10%) and potassium chloride. This is passed into a fourth mixing container 26 together with calcium chloride and sodium sulfate. The container 26 is kept at a temperature of between 25° C. and 70° C. The resulting mixture is separated with separator 28 into a solid, namely syngenite $(CaSO_4 \cdot K_2SO_4 \cdot xH_2O)$ which washed with water and retained for additional unit operations. The liquid is passed into a fifth sealed mixing container 30 containing lime or hydrated lime. The container is maintained at a temperature of about 80° C. in order to liberate ammonia (approximately 98% by volume). Residual ammonium is passed into air scrubber 32 resulting in the generation of calcium chloride/sodium chloride brine. This may be subjected to further processing to produce $CaCl_2$ or NaCl, disposed of in deep well injection or returned to the ocean.

Further processing includes additional scrubbing of the ammonium in scrubber 34 to which may be added sulfuric acid to result in the generation of ammonium sulfate, a useful fertilizer. Returning to the syngenite, the same is passed into a sixth mixer 36 maintained at 70° C. to which ammonium bicarbonate has been added. The mixture is passed into a separator 38 to generate calcium carbonate precipitate with a +95 brightness and a filtrate containing potassium sulfate and ammonium sulfate. The filtrate may be recycled to the initial steps of the process.

Figure 2:
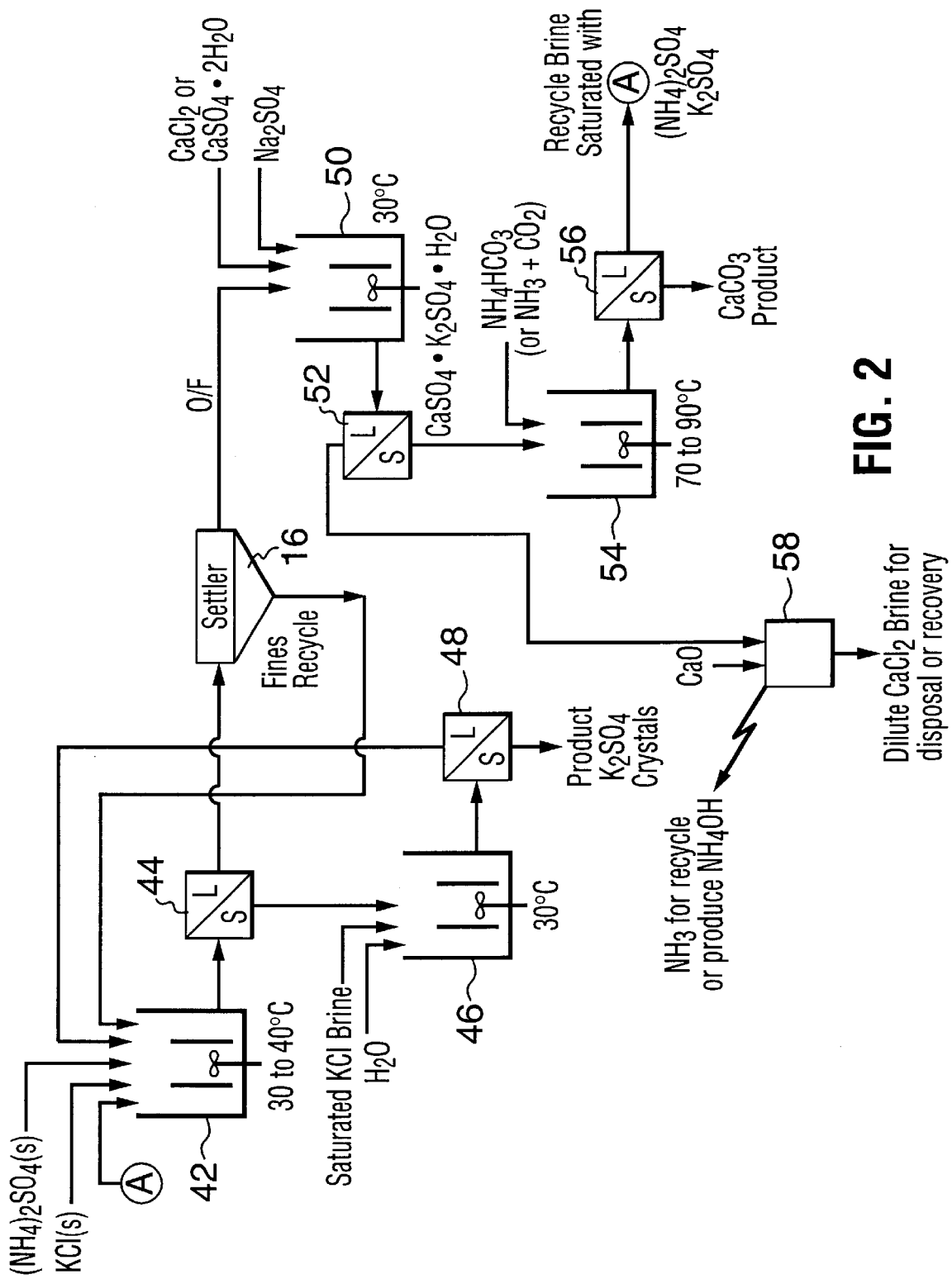
FIG. 2 is a schematic illustration of the process flow diagram according to another embodiment of the present invention.

In an alternative method, FIG. 2 illustrates a flow chart where potassium sulfate is formulated from ammonium sulfate contaminated with sodium sulfate. As is well known in the art, contaminated ammonium sulfate is not useful as a vendible high quality fertilizer.

Numeral 40 denotes the overall process for FIG. 2. Ammonium sulfate and potassium chloride are mixed together in mixing tank 42 at a temperature of between 30° and 40° C. such that there is only enough water to saturate either the ammonium sulfate or potassium chloride. The mixture is passed into a separator 44 to produce 80% to 90% potassium sulfate crystal containing approximately 10% to 20% ammonium sulfate. The crystal product is filtered and/or washed (not shown) added to a solution of saturated potassium chloride brine in mixing vessel 46 at a temperature of 30° C. The solution is filtered with filter 48 with the solid fraction containing in excess 98% pure ammonium sulfate. The crystals, once centrifuged and washed have been found to have a purity in excess of 99.5%.

The potassium chloride brine from vessel 46 is recycled to mixing vessel 42; the brine from vessel 42 contains between 20% and 30% ammonium chloride and preferably between 22% and 25%, 10% or less sodium chloride and 15% or less potassium chloride.

The heated brine is reacted with sodium sulfate and either calcium chloride or calcium sulfate dihydrate in vessel 50 at approximately 30° C. to precipitate the soluble potassium chloride as syngenite, $CaSO_4 \cdot K_2SO_4 \cdot (x)H_2O$ at separator 52.

The syngenite salt is then filtered and washed (not shown) to remove the residual chloride brine. The salt is then heated in vessel 54 at a temperature of between 70° C. and 90° C. together with water and a source of ammonia and carbon dioxide or ammonium bicarbonate to convert the calcium sulfate to calcium carbonate. The calcium carbonate is separated in separator 56. Since the ammonium sulfate and the SOP are soluble, the calcium carbonate precipitate is filtered and washed with water to remove entrained ammonium sulfate etc.

The calcium carbonate precipitate is of a sufficiently high quality and size to provide utility as a bulk paper filler of +95 brightness on blue light. The filtrate is recycled to vessel 42 as indicated by A in FIG. 2.

The filtrate from separator 52 is heated in vessel 58 at a temperature of between 60° C. and 100° C. and reacted with lime to yield a brine of calcium chloride, sodium chloride and ammonia gas. The ammonia gas is recovered for further purposes.

As an example, the following is a calculation and the chemistry involved in the process of FIG. 2.

EXAMPLE 1

Sodium Sulfate/Ammonium Sulfate is a Solid

Step 1

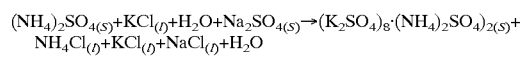

Step 2

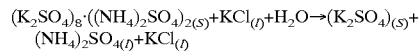

Step 3

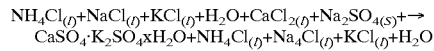

Step 4

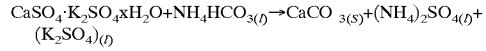

Step 5

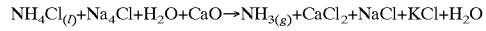

Some of $CaCl_2$ can be recycled to Step 3 but if that Cl builds up in the circuit; then one has to precipitate the $CaCl_2$ as $CaSO_4 \cdot 2H_2O$ and send the solid gypsum as the recycle.

Sample Calculation

Feed 25% $(NH_4)_2SO_4$ with 10% $Na_2SO_4$ @ 30° C. S.G. 1.300 therefore solution contains:

```
    325 g (NH4)2SO4           80% conversion
    130 g Na2SO4             100% conversion
    845 g H2O
   ─────
   1300 g
   Add solid KCl 291 + 135 + 120 (excess) = 546 g
A) Solids                  B) Liquid
    500.8 g K2SO4                304 g NH4Cl
     65 G (NH4)2SO4              106 g NaCl
    ─────
    566 g Double Salt            120 g KCl
                                  30 g KSO4
                                 845 g H2O
                                ─────
                                1405 g
A) Double Salt + 150 g KCl + 470 H2O
   Solids                  B) Liquid
    556 g K2SO4                  68 g NH4Cl
                                 30 g K2SO4
                                 77 g KCl
                                 470 g H2O
                                ─────
                                645 g
B) Liquid
    304 g NH4Cl
    106 g NaCl         168.2 g CaSO4 H2O + 102 g Na2SO4
    120 g KCl
     30 g K2SO4
    845 g H2O
   ─────
   1405 g
D) Solids (sygenite) - 140 g K2SO4 +168 g → CaSO4.2H2O = 309 g
E) Liquid
    304 g NH4Cl
    189 g NaCl
     14 g KCl
     14 g K2SO4
    845 g H2O
   ─────
   1366 g
D) Solids (sygenite) - 308 g + 152 g NH4HCO3 + 750 g H2O →
                                F(solids) + G(liquid)
F) CaCO3
G) Liquid Recycle to Step 1
    129 g NH4SO4
    140 g K2SO4
    750 g H2O
   ─────
   1019 g
E) Liquid                         (Brine)
    304 g NH4Cl +                  253 g CaCl2
    189 g NaCl + 130 g CaO → NH3(gas)  189 g NaCl
    120 g KCl                       14 g KCl
     30 g K2SO4                     14 g K2SO4
    845 g H2O                      845 g H2O
   ─────                          ─────
   1405 g                         1315 g
```

Recycle of G increases the circuit efficiency and one can adjust the material balance to the desired recycle and recovery. Discharge brine is deep well injected or evaporated to produce $CaCl_2$ brine for sales. Estimated K recovery can be calculated to be:

$$KCl \text{ exit} = 14 \text{ g}$$
$$K_2SO_4 \text{ exit} = 14 \text{ g} = 11.9 \text{ g } KCl \Big\} 26 \text{ g}$$

Therefore: $1 - \frac{26}{546} \times 100 = 95.2\%$ $SO_4$ Recovery: $1 - \frac{8}{324} \times 100 = 97.5\%$ This process compares favourably to any current commercial process, but without evaporators.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method for producing potassium sulfate from a source containing ammonium sulfate, comprising:

reacting potassium chloride and ammonium sulfate in a mixer (42) at a temperature between 30 and 40° C. to produce a slurry containing potassium sulfate and ammonium sulfate;

passing the slurry containing potassium sulfate and ammonium sulfate through a solids/liquid separator (44) to obtain a filtrate and solids comprising potassium sulfate;

reacting said solids comprising potassium sulfate with a solution of potassium chloride in a mixer (46) to produce a slurry containing potassium sulfate;

passing the slurry containing potassium sulfate through a solids/liquid separator (48) to obtain a filtrate and potassium sulfate crystals;

recycling the filtrate from solids/liquid separator (48) back to the mixer (42);

passing the filtrate from solids/liquid separator (44) to settler (16), where this filtrate is separated into fines, which are recycled back to mixer (42), and an overflow liquor;

reacting said overflow liquor with sodium sulfate and either calcium chloride or calcium sulfate dihydrate in mixer (50) at a temperature of 30° C. to produce a slurry containing syngenite, $CaSO_4 \cdot K_2SO_4 \cdot xH_2O$, and passing the slurry containing syngenite into a solids/liquid separator (52) to produce a filtrate and solid syngenite.

2. The process of claim 1, wherein said source containing ammonium sulfate contains less than 40% by weight of ammonium sulfate.

3. The process of claim 1, wherein said solution of potassium chloride is saturated with potassium chloride.

4. The process of claim 1, wherein said potassium sulfate crystals have a size in the range of approximately 20 mesh to 150 mesh.

5. A method for producing potassium sulfate from a source containing ammonium sulfate, comprising the steps:

reacting potassium chloride and ammonium sulfate in a mixer (14) at a temperature of less than 30° C. to generate a slurry of $K_2SO_4 \cdot (NH_4) \cdot 2SO_4$ double salt;

passing said slurry through a solids/liquid separator (16) to obtain a filtrate and solid double salt;

reacting said filtrate and potassium chloride in a mixer (18) to generate a slurry;

passing the slurry from mixer (18) through a solids/liquid separator (20) to obtain a filtrate containing ammonium chloride; potassium chloride and sodium chloride and solid double salt;

reacting the solid double salt from solids/liquid separator (16) and from solids/liquid separator (20) with potassium chloride in a mixer (22) to produce a product;

passing said product through a solids/liquid separator (24) to obtain a filtrate, which is recycled back into mixer (18) and solid potassium sulfate;

reacting said filtrate containing ammonium chloride; potassium chloride and sodium chloride with a solution of calcium chloride and solid sodium sulfate in a mixer (26) at a temperature that is less than 70° C. to generate a slurry of syngenite ($CaSO_4 \cdot K_2SO_4 \cdot xH_2O$);

passing the syngenite slurry through a solids/liquid separator (28) to obtain a filtrate and solid syngenite;

reacting the filtrate from solids/liquid separator (28) with a solution of about 23.6% ammonium chloride and lime or hydrated lime in a mixer (30) at a temperature of about 80° C. to produce ammonia and a liquid containing residual ammonium values;

reacting the solid syngenite with ammonium bicarbonate in a mixer (36) at a temperature of about 70° C. to produce a slurry containing calcium carbonate, potassium sulfate and ammonium sulfate, and passing the slurry containing calcium carbonate, potassium sulfate and ammonium sulfate into a solids/liquid separator (33) to obtain solid calcium carbonate and a filtrate containing potassium sulfate and ammonium sulfate.

6. The process of claim 5, wherein said source containing ammonium sulfate contains less than 40% by weight of ammonium sulfate.

7. The process of claim 5, wherein the potassium chloride reacted with the double salt in the mixer (22) is a saturated solution of potassium chloride.

8. The process of claim 5, wherein the solid potassium sulfate from solids/liquid separator (24) is in the form of crystals having a size in the range from approximately 20 mesh to 150 mesh.

* * * * *